(12) United States Patent
Fux et al.

(10) Patent No.: US 7,787,694 B2
(45) Date of Patent: Aug. 31, 2010

(54) SCALABLE STROKE FONT SYSTEM AND METHOD

(75) Inventors: Vadim Fux, Waterloo (CA); Denis N. Fedotenko, Waterloo (CA)

(73) Assignee: Research In Motion Limited, Waterloo (CA)

( * ) Notice: Subject to any disclaimer, the term of this patent is extended or adjusted under 35 U.S.C. 154(b) by 228 days.

(21) Appl. No.: 12/054,029

(22) Filed: Mar. 24, 2008

(65) Prior Publication Data

US 2008/0218522 A1  Sep. 11, 2008

Related U.S. Application Data

(63) Continuation of application No. 11/828,588, filed on Jul. 26, 2007, now Pat. No. 7,362,898, which is a continuation of application No. 10/610,227, filed on Jun. 30, 2003, now Pat. No. 7,251,365.

(60) Provisional application No. 60/400,373, filed on Jul. 31, 2002, provisional application No. 60/393,795, filed on Jul. 3, 2002.

(51) Int. Cl.
*G06K 9/18* (2006.01)
*G06T 11/00* (2006.01)

(52) U.S. Cl. .................... 382/185; 345/467

(58) Field of Classification Search ......... 382/185–190, 382/202–203, 224, 298, 313; 345/467, 469, 345/471–472; 715/269
See application file for complete search history.

(56) References Cited

U.S. PATENT DOCUMENTS

| | | | |
|---|---|---|---|
| 5,404,436 A | 4/1995 | Hamilton | |
| 5,412,771 A | 5/1995 | Fenwick | |
| 5,577,177 A | 11/1996 | Collins et al. | |
| 5,583,978 A | 12/1996 | Collins et al. | |
| 5,606,649 A | 2/1997 | Tai | |
| 5,771,034 A | 6/1998 | Gibson | |
| 5,781,714 A | 7/1998 | Collins et al. | |
| 5,859,648 A | 1/1999 | Moore et al. | |
| 5,917,501 A | 6/1999 | Muller et al. | |
| 5,920,324 A | 7/1999 | Hasegawa et al. | |
| 5,982,387 A | 11/1999 | Hellmann | |

(Continued)

FOREIGN PATENT DOCUMENTS

CN     1234564 A     11/1999

(Continued)

OTHER PUBLICATIONS

Letter from China Science (email dated Jun. 25, 2009) reporting Office Action dated Jun. 19, 2009 for Chinese Pat. Appln. No. 200710096770.0 (2 pgs).

(Continued)

*Primary Examiner*—Daniel G Mariam
(74) *Attorney, Agent, or Firm*—Jones Day; Krishna K. Pathiyal; Robert C. Liang

(57) ABSTRACT

A method of creating font format data from source font data includes analyzing the source font data to obtain glyph data for a plurality of glyphs, dissecting the glyph data, extracting midline data from the dissected glyph data, classifying the midline data as unique element data and common element data, associating unique element data and common element data to each glyph of the plurality of glyphs.

10 Claims, 13 Drawing Sheets

U.S. PATENT DOCUMENTS

| | | | |
|---|---|---|---|
| 6,043,826 A | 3/2000 | Manning | |
| 6,151,032 A | 11/2000 | Cheng | |
| 6,288,725 B1 | 9/2001 | Fu | |
| 6,288,726 B1 * | 9/2001 | Ballard | 345/468 |
| 6,426,751 B1 | 7/2002 | Patel et al. | |
| 6,501,475 B1 | 12/2002 | Cheng | |
| 6,661,417 B1 | 12/2003 | Cheng | |
| 7,251,365 B2 | 7/2007 | Fux et al. | |

FOREIGN PATENT DOCUMENTS

EP      0 192 929 A1      9/1986

OTHER PUBLICATIONS

Chinese Office Action dated Jun. 19, 2009 for Chinese Pat. Appln. No. 200710096770.0 (in Chinese) (3 pgs).

English translation of Chinese Office Action dated Jun. 19, 2009 for Chinese Pat. Appln. No. 200710096770.0 (5 pgs).

* cited by examiner

| COMMON ELEMENT ID | SHIFT X | SHIFT Y | SCALING |
|---|---|---|---|
| 001 | | | |
| 020 | | | |
| 420 | | | |
| ⋮ | ⋮ | ⋮ | ⋮ |
| UNIQUE ELEMENT 1 | [DESCRIPTION] | | |
| ⋮ | ⋮ | | |
| UNIQUE ELEMENT n | [DESCRIPTION] | | |

| COMMON ELEMENT ID | DESCRIPTION |
|---|---|
| 001 | |
| ⋮ | ⋮ |
| 020 | |
| ⋮ | ⋮ |
| 420 | |
| ⋮ | ⋮ |
| n | |

Fig. 2

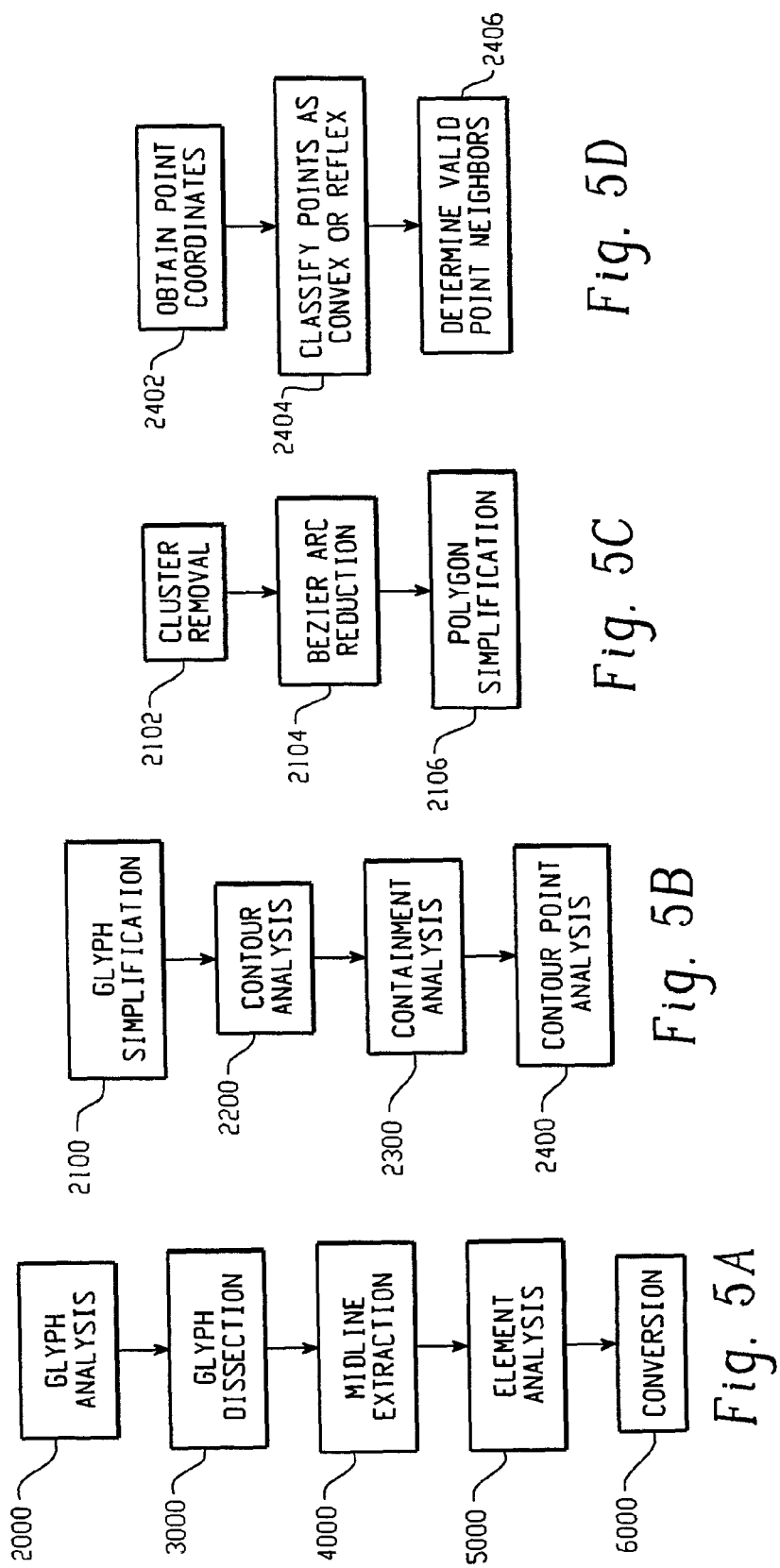

```
PICKING POINT...5  6 ──────────────────────────────── Starting routine picks a pair of points
Printing dissected stroke info...
Dissected stroke 0 taken from stroke 0 ──────────────────────────── Ordinal index of dissected stroke
Number of events: one side 1 opposite side 0 mutual segments events 0 Number of points 14
One side: starts at index 6  ends at index 36                                              Information about stroke's
Opposite side: starts at index 5  ends at index 1                                          events
Printing one side events...
Number of segments 2                                                                       Information about stroke's
Type 0                                                                                     start and end points for
30 9       35 32                                                                           each side
Printing dissected stroke outline points' indexes...
36   35   32   31   30   9   8   7   6   5   4   3   2   1
Finished dissected stroke...                                                               Information about events
Printing dissected stroke info...                                                          for each side and mutual
Dissected stroke 1 taken from stroke 0                                                     events
Number of events: one side 1 opposite side 1 mutual segments events 1 Number of points 12
One side: starts at index 32  ends at index 13
Opposite side: starts at index 35  ends at index 14
Printing one side events...                                                                Array of indexes of
Number of segments 1                                                                       points, the stroke contains
Type 0                                                                                     of
10 33
Printing opposite side events...
Number of segments 1                                                                       For strokes #1 (1016) and #2 (1014)
Type 0                                                                                     starting routine was not
17 34                                                                                      used but use the "events"
Printing mutual segments events...                                                         from stroke #0 (1010) instead
Number of segments 2
Type 0
33 34         10 17
Printing dissected stroke outline points' indexes...
13   12   11   10   33   32   35   34   17   16   15   14
Finished dissected stroke...
Printing dissected stroke info...
Dissected stroke 2 taken from stroke 0
Number of events: one side 1 opposite side 1 mutual segments events 1 Number of points 8
One side: starts at index 9  ends at index 18
Opposite side: starts at index 30  ends at index 37
Printing one side events...
Number of segments 1
Type 0
17 10
Printing opposite side events...
Number of segments 1
Type 0
34 33
Printing mutual segments events...
Number of segments 4
Type 0
10 33        17 34      17 34      18 37
Printing dissected stroke outline points' indexes...
18   17   10   9   30   33   34   37
Finished dissected stroke...
PICKING POINT...21 22 ────────────────────────────── Starting routine picks a pair of
Printing dissected stroke info...                                                          points again (Some events are
Dissected stroke 3 taken from stroke 0                                                     left in queue, but they are
Number of events: one side 0 opposite side 1 mutual segments events 0 Number of points 16  not processed, since the points
One side: starts at index 22 ends at index 28                                              around them are already owned,
Opposite side: starts at index 21  ends at index 29                                        therefore these events cannot be
Printing opposite side events...                                                           used for starting points)
Number of segments 2
Type 0
37 18      1 36
Printing dissected stroke outline points' indexes...
28   27   26   25   24   23   22   21   20   19   18   37   36   1   0   29
Finished dissected stroke...
All points processed OR can tolerate the unmarked points number!!!
```

*Fig. 12*

SCALABLE STROKE FONT SYSTEM AND METHOD

This application is a continuation of U.S. patent application Ser. No. 11/828,588, filed on Jul. 26, 2007 now U.S. Pat. No. 7,362,898, which is a continuation of application Ser. No. 10/610,227, now U.S. Pat. No. 7,251,365, filed on Jun. 30, 2003, which claims the benefit of U.S. Provisional Application Ser. Nos. 60/393,795, filed Jul. 3, 2002, and 60/400,373, filed Jul. 31, 2002, the entire disclosures of which are incorporated herein by reference.

BACKGROUND

1. Field of the Invention

This invention generally relates to scalable stroke fonts, and in particular relates to a system and method for creating scalable stroke font data and storing scalable stroke font data on a mobile computing device ("mobile device").

2. Background

Text data, such as font data, is typically stored in a memory in a mobile device. Because the mobile device typically has relatively limited memory and processing resources, the amount of text data stored on the mobile device and the text rendering capability of the mobile device is often limited.

There are three basic font types: Bitmap, Outline and Stroke. Bitmap fonts are stored as graphic images of characters with each point size of a typeface stored as a separate font. Each character is stored as an array of pixels (a bitmap). Bitmap fonts require a relatively large amount of storage space, and it is relatively difficult to scale or apply effects to this type of font.

Outline fonts, such as TrueType™ fonts, are produced from information about the shape, or outline, of the glyphs. The outline is defined as a set of lines and curves. Outline fonts facilitate scaling and other effects better than bitmap fonts, and require less storage space than bitmap fonts. Many mobile devices, however, typically do not have the storage space and processing requirements to adequately facilitate the use of outline fonts.

Stroke fonts are those in which the shapes of the characters, as represented by glyphs, are represented by strokes. A stroke is typically defined by a line and curves. The storage space required for stroke font data for a given set of glyphs is typically much smaller than required for corresponding outline font data. Stroke fonts, however, typically produce glyphs with impaired quality as compared to outline fonts. Thus, existing rendering engines that render stroke-based fonts produce glyphs of relatively limited quality.

SUMMARY

A method of creating font format data from source font data includes analyzing the source font data to obtain glyph data for a plurality of glyphs, dissecting the glyph data, extracting midline data from the dissected glyph data, classifying the midline data as unique element data and common element data, and associating unique element data and common element data to each glyph of the plurality of glyphs.

A system for creating font format data from source font data includes a glyph analysis software module, a glyph dissection software module, a midline extraction software module, and an element analysis software module. The glyph analysis software module is operable to analyze the source font data and obtain glyph data for a plurality of glyphs from the source font data. The glyph dissection software module is operable to dissect the glyph data for each glyph into stroke data. The midline extraction software module is operable to extract midline data from the stroke data. The element analysis software module is operable to classify the midline data as unique element data and common element data and associate the unique element data and the common element data to each glyph of the plurality of glyphs.

BRIEF DESCRIPTION OF THE DRAWINGS

FIG. 2 is a block diagram of a compact font format data structure;

FIG. 5A is a flowchart of a method of creating a stroke font from an outline font;

FIG. 5B is a more detailed flowchart of a glyph analysis process;

FIG. 5C is a flowchart of an exemplary simplification process.

FIG. 5D is a more detailed flowchart of a containment analysis process;

FIG. 12 is an exemplary log from processing the exemplary glyph of FIG. 10; and

DETAILED DESCRIPTION

Font data is typically stored on a computing device and is used to render text as glyphs. A font is a set of characters of a particular typeface design and size. The typeface is the particular design of a set of printed characters, such as Courier, Helvetica or Times Roman. Related characters typically comprise a script, such as Latin, Greek, Hiragana, Katakana or Han, subsets of which are used to write a particular language.

Glyphs are the visual element used to represent the characters; glyphs are the actual shape of a character image. Aspects of text presentation such as font and style apply to glyphs. For example, an italic Times font of the character "c" and a bold Times font of the character "c" each have corresponding glyphs.

Figure 1:
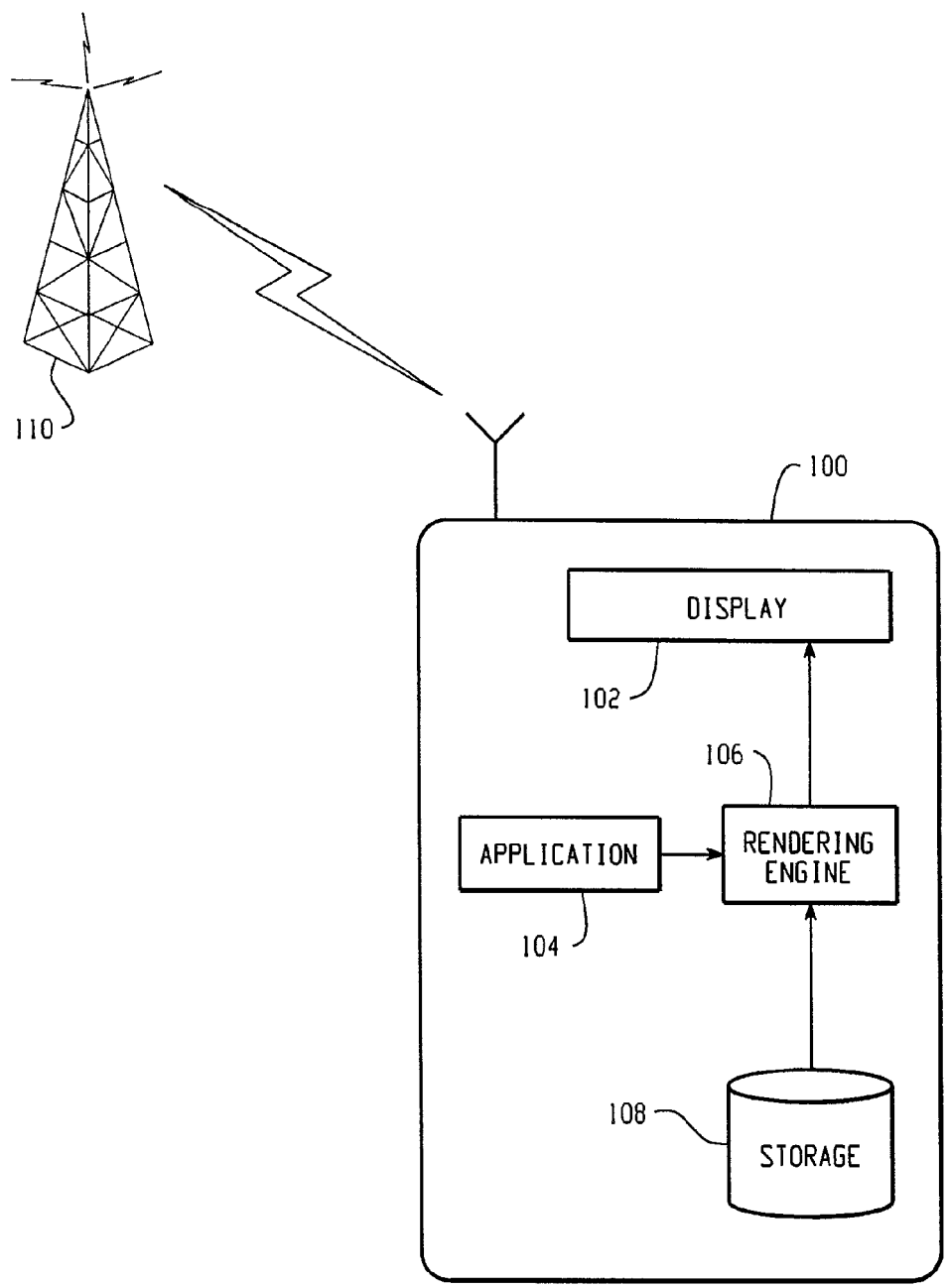
FIG. 1 is a block diagram of an exemplary mobile device.

A typical computing device that is operable to store text data for use in rendering text may be a personal computer or a mobile communication device. FIG. 1 is a block diagram of an exemplary mobile device 100 that is operable to display text on a display 102. The mobile device 100 includes an application program 104, usually stored in the storage 108, which is operable to request text to be displayed on the display 102. A rendering engine 106 is operable to receive the request from the application program 104 and, in response, retrieve the font data of the text from the storage 108 and render the font data into glyphs that are displayed on the display 102.

The mobile device 100 may be realized by a cellular telephone, a pager, a personal digital assistant, or other mobile computing device. If the mobile device 100 includes communication circuitry and functions, then the mobile device 100 is typically operable to communicate with a wireless network 110. The storage 108 is operable to store data in one or more formats, and may comprise a database, a file, a ROM or RAM memory, a network storage space, or even a memory storage for the rendering engine, such as a Flash memory module. The display 102 may be a CRT monitor, an LCD monitor, or other similar display device. One such exemplary mobile device 100 may be of the type disclosed in U.S. Pat. No. 6,278,442, entitled "HAND-HELD ELECTRONIC DEVICE WITH A KEYBOARD OPTIMIZED FOR USE WITH THE THUMBS," the entire disclosure of which is incorporated herein by reference.

The font data of the text may be stored as a stroke font that is defined by a "skeleton" of the characters. The skeleton comprises elements that may be common with other glyphs, and unique elements that may be unique to a particular glyph. The rendering engine 106 renders the skeletons of characters to produce glyphs for displaying on the display 102.

FIG. 2 shows a block diagram of a compact font format data structure 200 operable to store a skeleton of an exemplary glyph. A plurality of data structures 200 may be stored to represent a corresponding plurality of glyphs. The data structure 200 may be stored in the storage 108 on the mobile device 100.

The data structure 200 illustratively comprises common elements 202 and unique elements 212. Each common element 202 comprises an element identifier 204, a shift X value 206, a shift Y value 208, and a scaling value 210. A common element identifier 204 corresponds to an element that may be common to two or more glyphs. Each unique element 212 comprises a unique element identifier 214 and an element description 216. A unique element identifier 214 is an element that is unique to a particular glyph. A particular glyph may be represented by common elements 202, unique elements 212, or a combination of common elements 202 and unique elements 212.

An element database 250 stores description data 218 for the common elements 202 identified by common element identifiers 204. The description data 218 is a set of points in an X-Y coordinate system that defines the lines and curves of the element. Other description data may also be used, however.

The particular glyph represented by the illustrative data structure 200 of FIG. 2 comprises common elements 202 identified by common element identifiers 001, 020, and 420. Because the description data 218 in the element database only describes the shape of the common elements 202, however, the common elements 202 are typically shifted in the X-Y coordinate system and scaled, as required by each particular glyph having such common elements 202. Accordingly, a shift X value 206 includes data relating to the shifting of the common element 202 along an x-axis on the X-Y coordinate system, and a shift Y value 208 includes data relating to the shifting of the common element 202 along a y-axis on the X-Y coordinate system. Scaling data 210 includes data relating to the scaling of the common element according to the particular glyph. Scaling of the element may increase or decrease the size of the element 212.

The unique elements 212 are elements that are unique to the particular glyph, and thus are not stored in the element database 250. Each unique element 212 is represented by a unique element identifier 214 and description data 216. The description data is a set of points in a X-Y coordinate system that defines the lines and curves of the unique element.

In another embodiment, the unique elements 212 may be stored in the element database 250 and identified by their corresponding unique element identifiers 214. The data structure 200 may thus store only the unique element identifiers 214 for the unique elements 212.

The rendering engine 106, in response to a request for the particular glyph, accesses the corresponding data structure 200 stored in the storage 108 and constructs a skeleton according to the elements 202 and 212. The skeleton is then utilized as the font data for rendering by the rendering engine 106, which then applies style, thickness of lines, and other characteristics of a typeface during rendering. In another embodiment, the skeleton according to the elements 202 and 212 may be constructed by another application or process external to the rendering engine 106, and then provided to the rendering engine 106.

If a plurality of fonts are to be used at the mobile device 100, separate element databases 250 may be stored in the storage 108. Each separate database 250 may correspond to a particular font. Alternatively, all font data may be stored in a single database 250.

Figure 3:
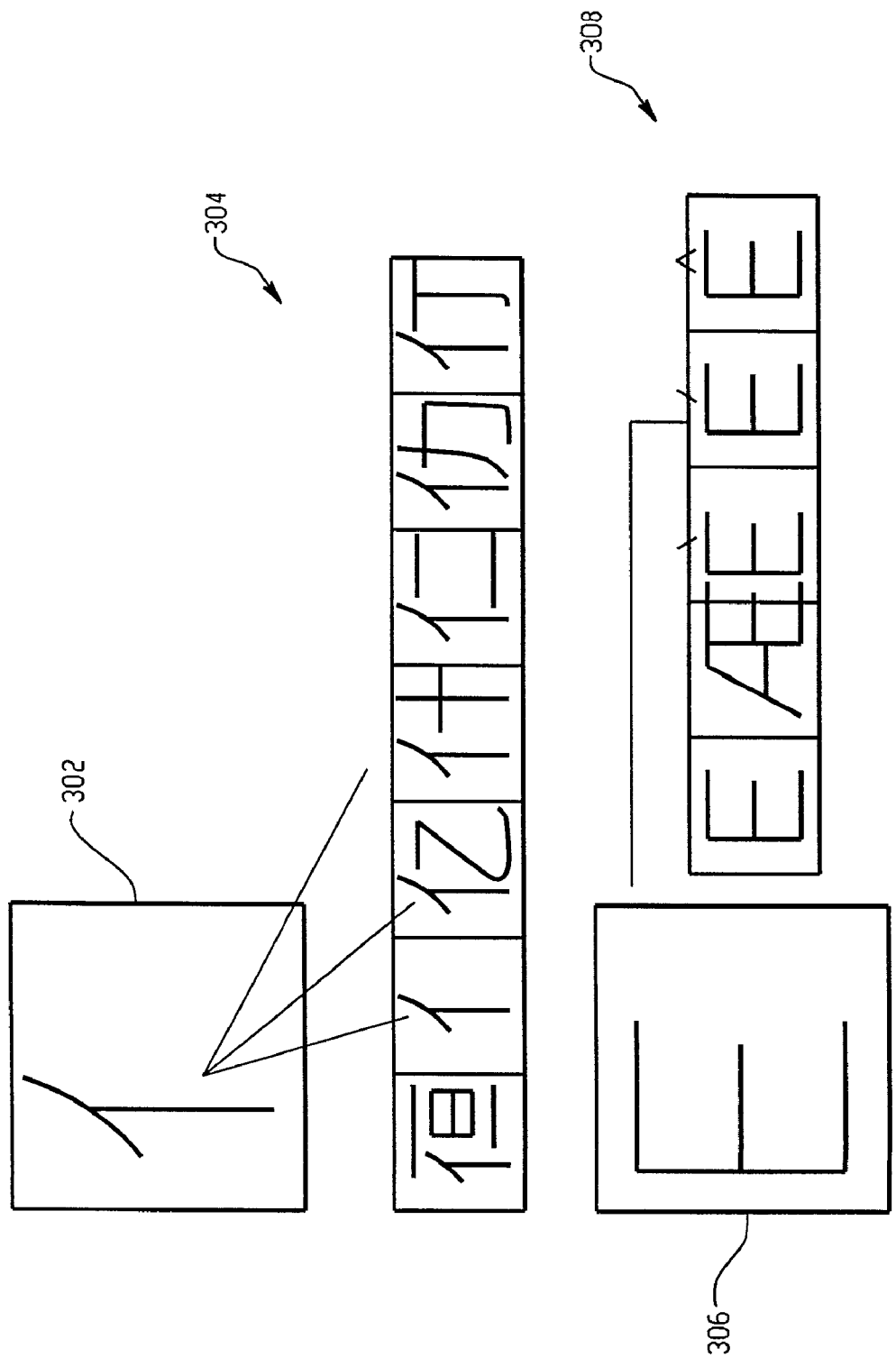
FIG. 3 illustrates repetitive usage of a common element in different glyphs.

FIG. 3 illustrates repetitive usage of a common element 302 and 306 in different glyphs of Chinese Japanese Korean ("CJK") ideographs 304 and in different glyphs of European glyphs 308, respectively. The common element 302 is shown in different glyphs of CJK ideographs 304, and the common element 306 is shown in the different European glyphs 308. For each particular glyph, the common elements 302 and 306 are shifted and scaled accordingly.

Figure 4:
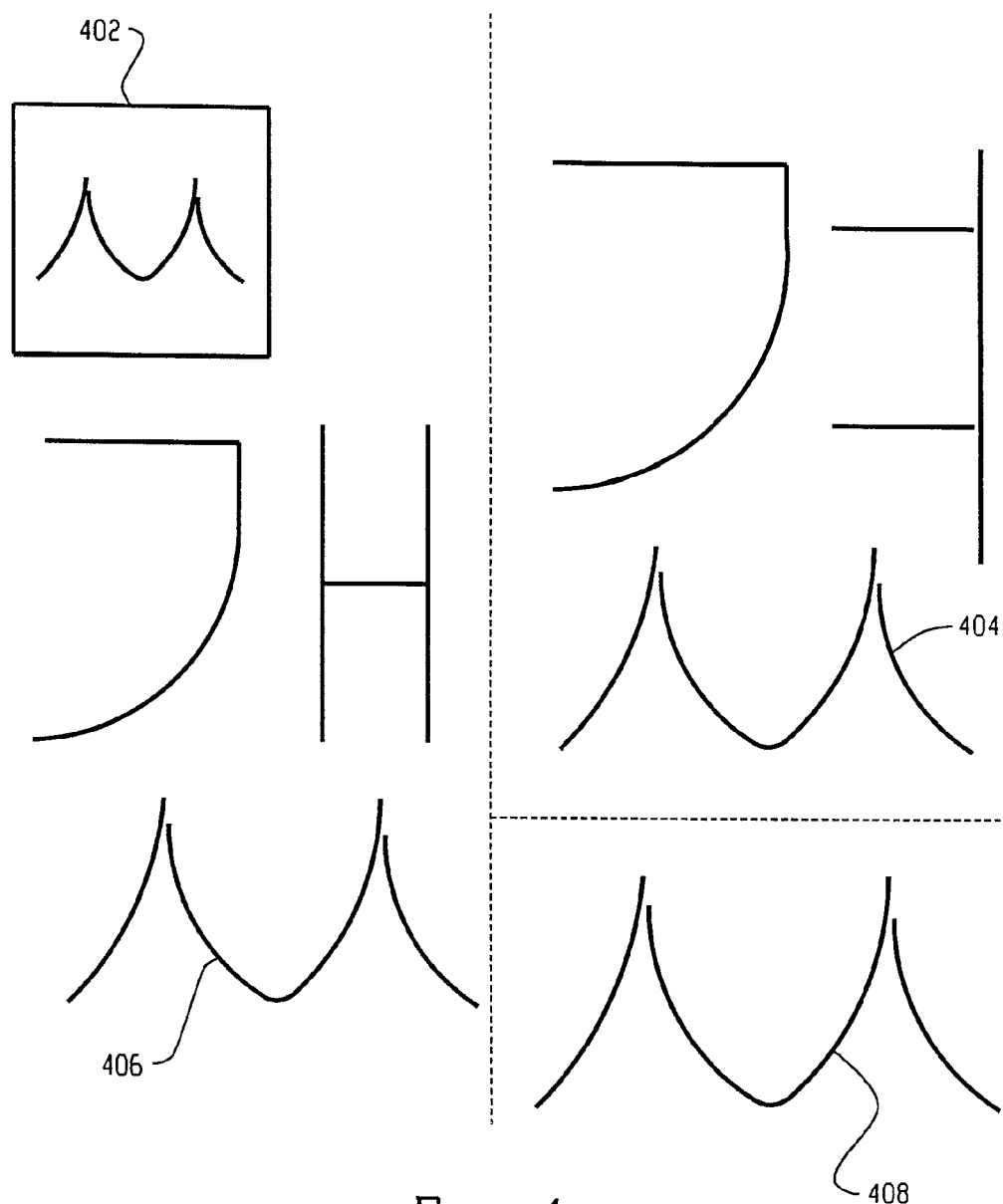
FIG. 4 illustrates shifting and scaling of a common element.

FIG. 4 illustrates shifting and scaling of a common element 402 used in three Korean glyphs 404, 406, 408. A first Korean glyph 404 shows the common element 402 in static form where it has not been shifted or scaled. A second Korean glyph 406 shows the common element 402 shifted towards one side. A third Korean glyph 408 shows the common element 402 scaled to a larger size.

FIG. 5A provides a flowchart of a method for creating stroke font data from source font data. In one embodiment, the source font data is outline font data. One example of outline font data is font data according to the TrueType™ font specification and as stored in the TrueType™ font file "glyph" table. Other outline font information may also be used.

For each glyph, the steps of glyph analysis 2000, glyph dissection 3000, midline extraction 4000, element analysis 5000, and conversion 6000 are performed. The process of FIG. 5A is typically executed on a computing device such as a server or personal computer to prepare the font data structure 200 and the element database 250 for storage on a mobile device 100. The process of FIG. 5A may, for example, comprise an exemplary structure of a software application program or set of instructions that cause a computing device to perform the processes. The process may be implemented on a single computing device, or may be distributed over several computing devices, such as several computers in communication over a computer network.

FIG. 5B provides a more detailed flowchart of the glyph analysis step 2000. During the glyph analysis step 2000, information about a given glyph is collected and the shape of the glyph is simplified. The glyph analysis step 2000 includes the steps of glyph simplification 2100, contour analysis 2200, containment analysis 2300, and contour point analysis 2400. Unless otherwise stated, a contour is a polygon shape of a particular glyph, and a point is a vertex. A glyph may comprise a single contour, such as the following glyph for the letter "l", or maybe comprise a plurality of contours, such as the following glyph for the symbol "Θ".

During the step of glyph simplification, the outlines of a given glyph are simplified. During the step of contour analysis 2200, the contours of the given glyph are sorted into inner and outer contour groups. During the step of containment analysis 2300, the contours of the given glyph are processed to determine containment of the contours. During the step of contour point analysis 2400, data related to each contour point is collected. This data may include Cartesian coordinates, angles of the point with respect to other points, valid neighboring points, etc.

Figure 6:
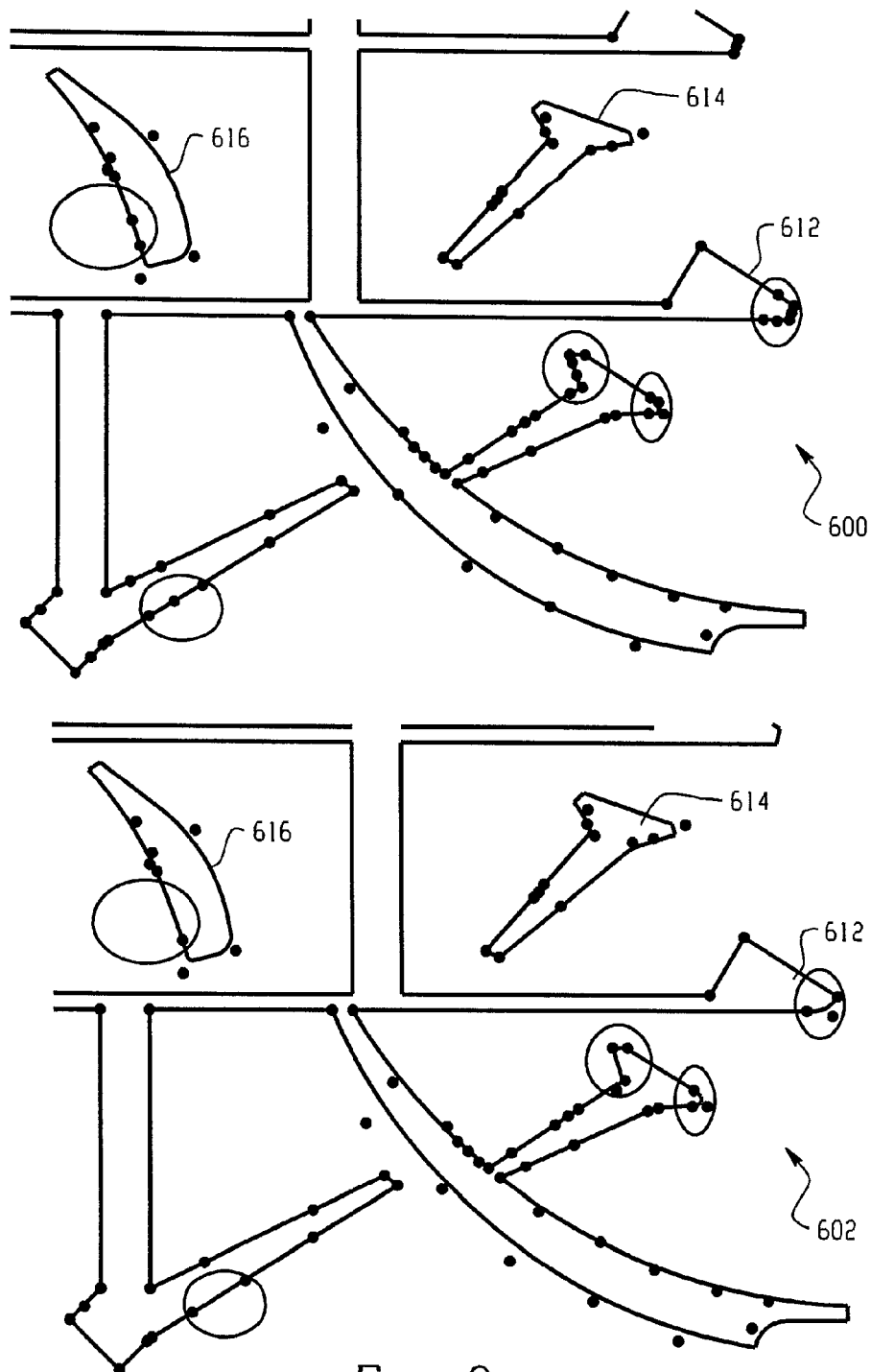
FIG. 6 illustrates a glyph in a non-simplified form and in a simplified form.

FIG. 6 illustrates a line diagram of a glyph in non-simplified form 600 and in a simplified form 602 after the glyph simplification step 2100. As shown, the glyph 600 has contours 612, 614, and 616 comprising straight segments and Bezier arcs. The contours 612, 614 and 616 of the glyph 600 are simplified in the circled regions to simplify processing in later steps. The glyph simplification step 2100 may be omitted if processing reduction is not required or not of particular concern.

The simplification is accomplished by removing redundant points in the shape of the given glyph. FIG. 5C shows an exemplary simplification process. The simplification process may comprise a cluster removal process 2102, a Bezier arc degree reduction process 2104, and a polygon simplification process 2106. Other simplification processes may also be used.

During the cluster removal process 2102, groups of points ("clusters") where the points are proximate such that the points are unable to define a significant segment in the contour are simplified to new segments by removing points or segments. Typically, these are relatively short segments or points that may be removed from a glyph definition while causing minimal or no distortions to the shape of the given glyph.

For segment removal, a maxim length and/or angle for a redundant segment is defined. The specified value for the maxim length and/or angle may be user defined, or determined automatically based on simplification criteria. Typically, a larger maxim length and/or angle results in additional simplification, but may also result in additional visible distortion. The maxim length is typically determined by the desired quality of the result stroke font desired.

A straight segment, whose length and/or angle is less than or equal to the specified values is simplified or removed by removing one or more of the points from the outline of the glyph. The removal process may be implemented by an iteration through the points of all the contours and determining the length of each segment defined by a pair of $n_i$–$n_{i+1}$ vertices and removing the segments that satisfy the condition length and/or angle conditions. Each contour is processed repetitively until the number of removed segments is zero. This iteration process is repeated for each of the contours of the outlines of the glyph.

During the Bezier arc degree reduction process 2104, Bezier arcs are simplified. Bezier arcs are defined by polynomials of 2nd (quadratic Bezier) or 3rd (cubic Bezier) degree. Quadratic Bezier arcs are defined as sequences of three points: on-curve—off-curve—on-curve. Cubic Bezier arcs are defined as sequences of four points: on-curve—off-curve—off-curve—on-curve. "Degree reduction" is a process of reducing a cubic arc into a conic arc, thus reducing the degree of polynomial from 3 to 2. Degree reduction finds an intersection point of two segments of the cubic arc. For example, if the cubic arc is defined by four vertices: $n_i$, $n_{i+1}$, $n_{i+2}$, $n_{i+3}$, then the intersection point of $n_i$–$n_{i+1}$ and $n_{i+2}$–$n_{i+3}$ segments is determined. The intersection point is then defined as a new off-curve point of the arc and the arc's definition is further defined as:

$$n_i\text{-new control/off-curve point-}n_{i+3},$$

where the vertices $n_{i+1}$ and $n_{i+2}$ are replaced by the single point new control/off-curve point. The start and end points of the arc are preserved, and the number of insignificant points in the contour is thus reduced. Of course, other arc simplification routines may also be used.

During the polygon simplification process 2106, contour points that lie at a certain distance from the line defined by its two immediate neighbors on either side are removed. For example, a point is removed when a difference between the straight angle and the angle defined by the point and two neighbors is less than a constant value or "maximal angle." The maximal angle may be user defined, or determined automatically based on the desired amount of glyph simplification.

To illustrate, given triple vertices $n_{i-1}$, $n_i$, $n_{i+1}$, the angle $n_{i-1}$–$n_i$–$n_{i+1}$ is calculated. When the difference between this angle and the straight angle is less than the maximal angle, then the $n_i$ point is discarded. There may exist two thresholds for off-curve and on-curve points, respectively. For example, if the $n_i$ point of the triple $n_{i-1}$, $n_i$, $n_{i+1}$ is on-curve, then one maximal angle value $s_1$ may be used; when the $n_i$ point is off-curve, another maximal angle value $s_2$ may be used.

Figure 7:
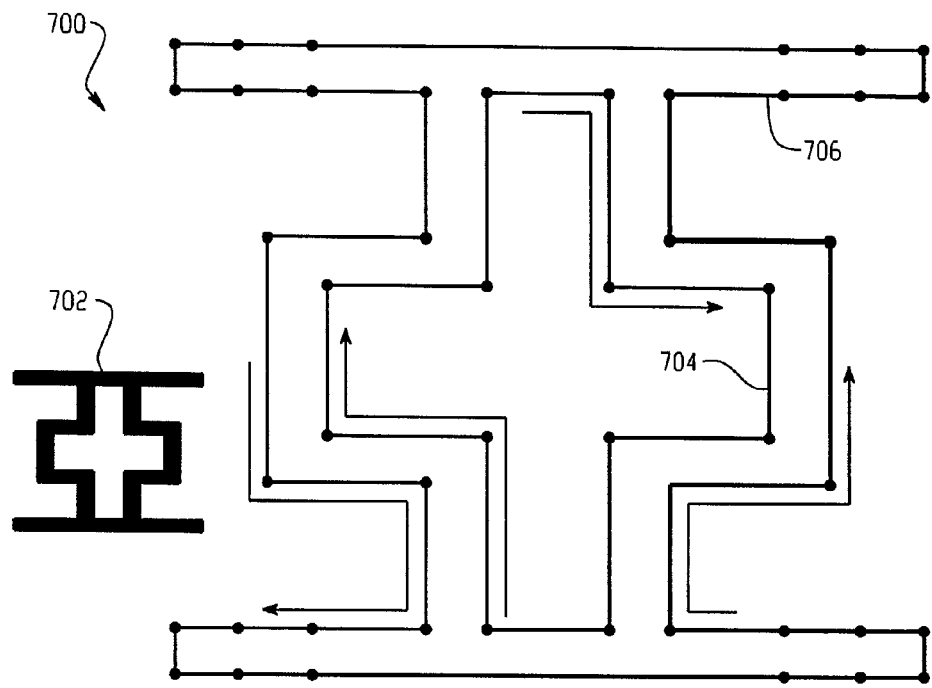
FIG. 7 illustrates a glyph having an inner contour and an outer contour.

After simplification, the contours of the given glyph are sorted into inner and outer contour groups during the contour analysis 2200 step. FIG. 7 shows an outline shape 700 of a glyph 702 having an inner contour 704 and an outer contour 706. The inner contour 704 illustratively defines bound spaces within the outer contour 706. Such a shape may be described as a polygon with "holes" in which the outer contour 706 is a polygon outer boundary and the inner contour 704 defines the "hole" inside the polygon.

According to TrueType™ conventions, inner and outer contours are defined to be ordered in opposite directions. For example, the outer contour direction is clockwise and inner contour direction is counter-clockwise, or vice-versa. In order to determine the direction of the contours, the points of each of the contours are iterated through, and the signed area of the contour is computed according to the formula of polygon's area:

$$\text{poly\_area} = 0.5 * [(V_0 \cdot x * V_1 \cdot y - V_1 \cdot x * V_0 \cdot y) +$$
$$\ldots + (V_i \cdot x * V_{i+1} \cdot y - V_{i+1} \cdot x * V_i \cdot y) +$$
$$\ldots + (V_{n-1} \cdot x * V_n \cdot y - V_n \cdot x * V_{n-1} \cdot y)],$$

where $V_i$ is a polygon's vertex and n is the total number of vertices in the polygon. The resulting value of the poly_area is a signed value that determines whether the contour is ordered clockwise or counter-clockwise. A positive value corresponds to counter-clockwise direction, and a negative sign corresponds to clockwise direction. If the area is zero, the direction is generally undefined and thus may be set as a default clockwise or counter-clockwise direction. In one embodiment, the contour is defined to be of counter-clockwise direction if the area is zero.

After sorting, the contours of the given glyph are processed to determine containment during the containment analysis step 2300. Each outer contour is analyzed to determine if an inner contour is contained within it. Each of the contours is then classified accordingly. The classification determines separate shapes for each glyph, and thus the glyph may be defined as a collection of separate shapes. Each of the separate shapes comprises one or more contours, the first contour being the outer contour and any other contours being inner contours.

Containment may be determined by a simple brute-force algorithm that takes every inner contour and iterates through its points. Other containment algorithms may also be used. In the brute-force algorithm, every point of each inner contour is iterated and checked to determine whether it is inside an outer contour for all outer contours. If all of the points of an inner contour are inside one of the outer contours, then the inner contour is completely contained in the outer contour. In one embodiment, the outer contour is defined as a containing contour, and the inner contour is defined as a contained contour. Once all of the outer and inner contours are classified, the given glyph may be represented as a sequence of separate shape data structures. Each data structure contains a reference to the given glyph, and information about the glyph's containing and contained contours.

The points of the contours are then processed during the contour point analysis step 2400. Outline information about each remaining point corresponding to the raw glyph data is analyzed. Point coordinates are obtained from the analysis, as shown in step 2402 of FIG. 5D. In the TrueType™ font example, the information is obtained from TrueType™ file. This information includes the coordinates of the points and specified in font units, the type of point (e.g., on-curve or off-curve point), and the index of the points into an array of points of the raw glyph data from the TrueType™ file.

The points of each of the separate shapes are classified to provide additional information about each point. The inner angle of each point is determined and, based on the value, the point is assigned to be of convex or reflex type as shown in step 2404, and valid neighbors of each of the points are determined, as shown in step 2406.

During the classification of each point as convex or reflex, two angles at vertex $n_i$ are determined. One angle is classified as an inner angle and the other angle as an outer angle. The inner angle refers to an angle defined by the point and two of its immediate neighbors and belonging to the interior or bounded region of the polygon (given the vertex $n_i$ of the polygon, there exists the triangle defined by $n_{i-1}, n_i, n_{i+1}$). The outer angle refers to an angle defined by the point and two of its immediate neighbors and belonging to the exterior or unbounded region of the polygon (again, given the vertex $n_i$ of the polygon, there exists the triangle defined by $n_{i-1}, n_i, n_{i+1}$).

The two angles at vertex $n_i$ sum to 360 degrees. The vertex $n_i$ point is a common point in the set of points $n_{i-1}, n_i, n_{i+1}$. To define an angle, it is determined whether the vertex $n_{i+1}$ lies on a first side or a second side of the line defined by the $n_{i-1}$–$n_i$ segment. The formula for determining the signed area of a triangle is used, where the triangle is defined by a triple of $n_{i-1}, n_i, n_{i+1}$ vertices. For clockwise-oriented contours, a positive value for the triangle area corresponds to the $n_{i+1}$ vertex being on the first of the line defined by $n_{i-1}$–$n_i$ pair of vertices. The $n_i$ vertex is thus a reflex type. Conversely, a negative or zero value corresponds to the $n_i$ vertex being on the right of the line defined by $n_{i-1}$–$n_i$ pair of vertices, and thus the $n_i$ vertex is a convex type. For the counter-clockwise-oriented contours, the definition is reversed.

The values of angles in degrees may be determined by law of cosines. Any point having an obtuse inner angle is thus classified as a reflex point, and any point having an acute inner angle is classified as a convex point. When the inner angle is straight, the point may be defined as a convex point according to one embodiment of the present invention. In another embodiment, when the inner angle is straight, the point is defined as a reflex point.

Valid neighboring points ("valid neighbors") are also determined for each point, as shown in step 2406. Any point of the contours of the given glyph is a valid neighbor of any other given point if: (1) both points belong to the same separate shape, e.g., both points belong to either to the outer contour or to any contained inner contours; and (2) a line segment defined by the two points does not cross any other segment of any contour of the separate shape, e.g., the line segment defined by the two points is completely contained inside the separate shape. If any point satisfies the above two conditions, it is added to the list of valid neighbors of the point in question. Valid neighbors are then sorted by their distances from the given point and ranked such that the closest neighbor is ranked first.

The area of the separate shape is defined by the conjunction of its outer and inner contours:

$S_{area} = (A \cup B_i + A \cup B_{i+1} + \ldots + A \cup B_{i+n}) - (A \cap B_i + A \cap B_{i+1} + \ldots + A \cap B_{i+n})$, where S is the separate shape area, $A_{area}$ is the area of an outer contour of the separate shape S, and $B_{i \ldots n}$ are areas of inner contours of the separate shape S.

Valid neighbors of a given point may be characterized "seen" points from the given point. A straight line segment is drawn to connect a point to the given point and represents a visual path between the two points. If the straight line segment is not interfered by a separate shape or another line segment of the contour, then the point is a valid neighbor of the given point, i.e., the point is "seen" from the given point.

Figure 8:
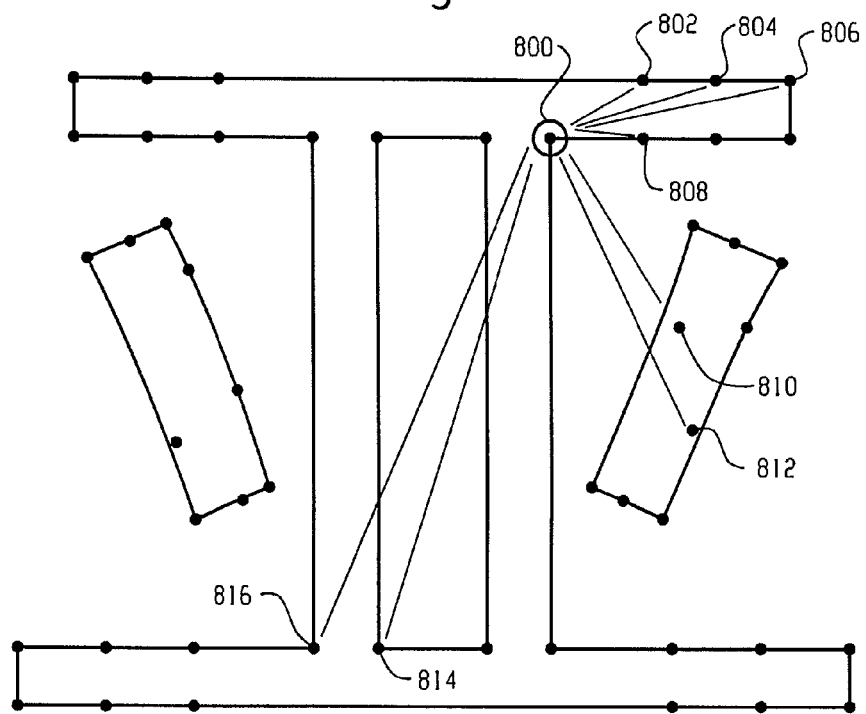
FIG. 8 illustrates a glyph having valid and non-valid neighbors of a point.

FIG. 8 shows a line diagram of a glyph shape with lines between points to provide a pictorial explanation of valid and non-valid neighbors of a point 800. The lines between point 800 and other points 802, 804, 806, and 808 illustrate that the other points 802, 804, 806, and 808 are valid neighbors of the point 800. The other points 802, 804, 806, and 808 are "seen" from the point 800 without crossing any segment of the glyph shape and belong to the same separate shape as the point 800. The lines between point 800 and points 810 and 812 illustrate that the first points 810 and 820 are not valid neighbors of point 800, because the point 800 and the first points 810 and 812 do not belong to the same separate shape. The lines between point 800 and the points 814 and 816 illustrate that the second points 814 and 816 are not valid neighbors of point 800, because these lines cross segments of the glyph shape.

During the glyph dissection step 3000, the glyph is dissected/decomposed into a series of "strokes". The strokes do not necessarily have a correspondence to each of the separate shapes of the given glyph. One separate shape may be dissected/decomposed into a number of strokes. Unless stated otherwise, the terms "dissection" and "decomposition" are used interchangeably.

Figure 9:
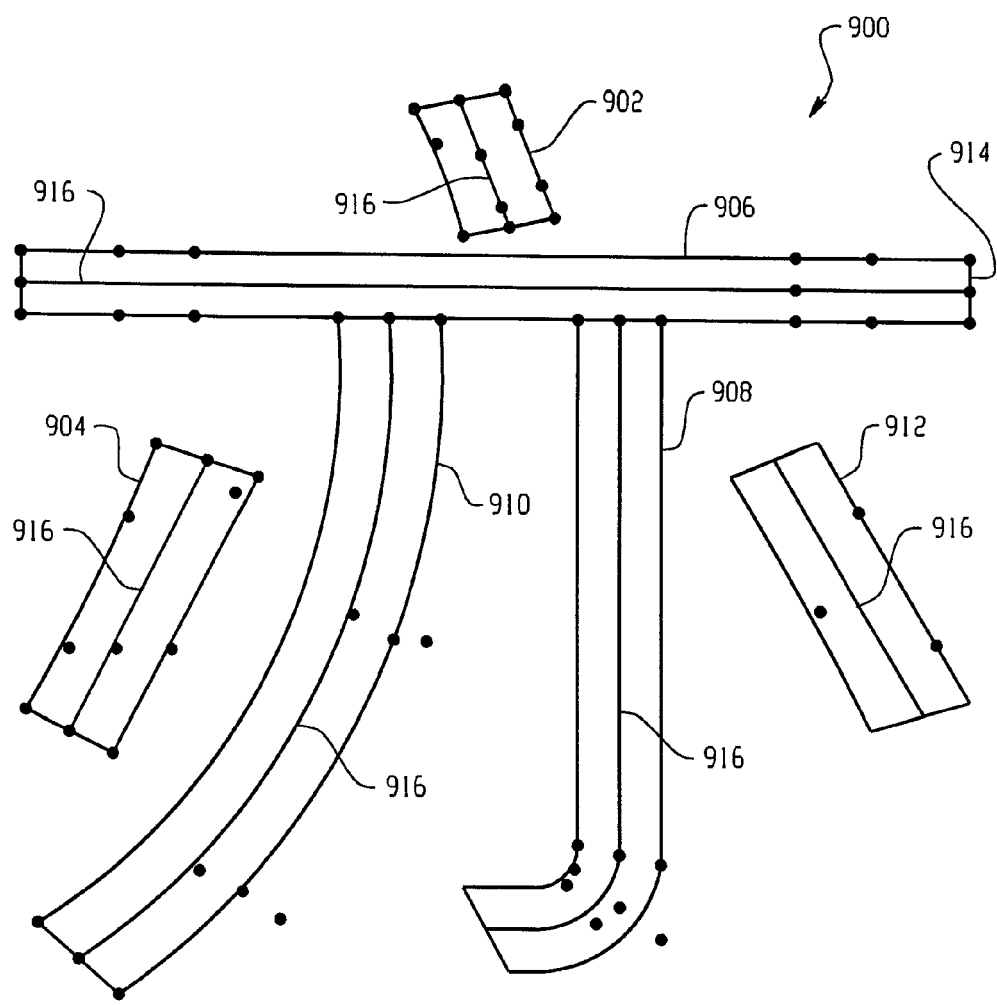
FIG. 9 illustrates a glyph dissected into strokes.

FIG. 9 shows a line diagram of an example of a sample glyph 900 dissected into strokes as indicated by numbers 902, 904, 906, 908, 910, and 912. As also shown, separate shape 914 has three strokes indicated by the numbers 906, 908, and 910.

A stroke may correspond to the method by which characters are drawn with a pen or painted with a paintbrush. Some characters may be drawn with just one stroke, for example, while others may require several strokes. A "vector of movement" may thus be derived from the concept of the natural movement of a pen. The vector of movement corresponds to the points of a stroke that lie along the same path that resembles the natural movement of a pen. Because not all the points of the outline may lie along the same path, the vector of movement is applied only to certain sets of points in order to define the movement of a stroke.

Figure 5E:
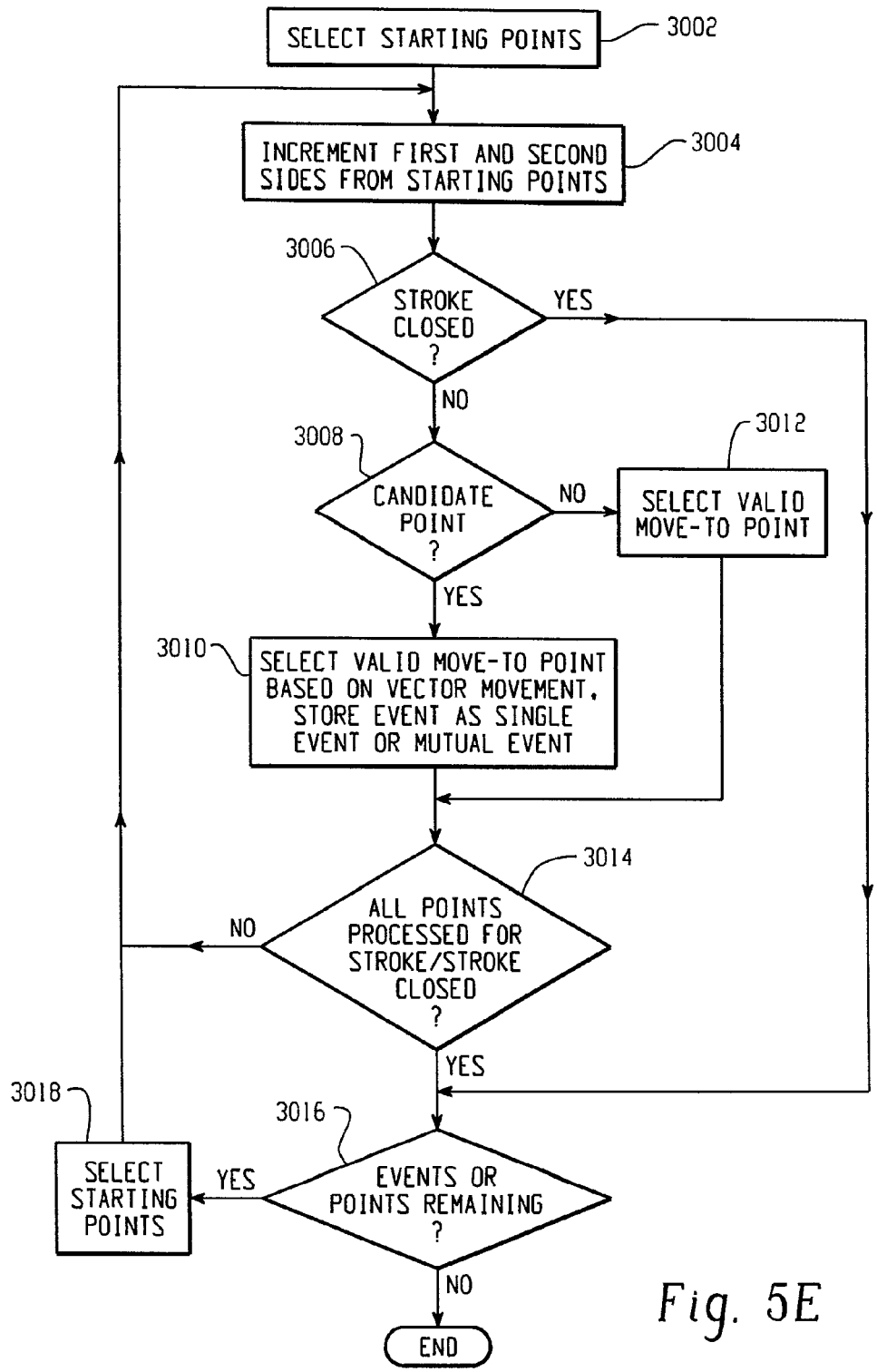
FIG. 5E is a flowchart of an exemplary glyph dissection process.

FIG. 5E provides a flowchart of an exemplary glyph dissection process. Each extracted stroke is geometrically defined as a closed polygon or contour. Each stroke has two sides, a first side of the stroke and a second side of the stroke. Each side has a pair of start and end points, denoting the points where the side starts and ends. All the points of both sides may be stored in sequential order to facilitate sequentially incrementing from a first point of the first side to a last point of the second side.

In one embodiment, each contour may be represented by points in an array data structure, and each point may be referenced by the index of its entry in the array. Starting points are determined by selecting a pair of points to define the first and second sides, as shown in step 3002, and incrementing through the points on the first and second sides, as shown in step 3004. The first side of the stroke moves to the next entry in the array, and the opposite side moves to the previous entry in the array. For example, if a current point on the first side is point 3, then the next point to be incremented to is point 4. Likewise, if the current point on the second side is point 11, then the next point to be incremented to is point 10.

As the points are traversed, the paths defining the first and second sides of the contour move from point to point. The traversed path is stored as a set of point increments, and after each point increment, the system determines if a stroke is closed, as shown in step 3006. The stroke process is completed when the first and second sides meet at the same point. Other conditions may alternatively be satisfied for a stroke to be completed.

If the stroke is not closed, then for each incremented point, it is determined whether the incremented point is a candidate point, as shown in step 3008. A candidate point corresponds to a turn or angle in the outline where two or more strokes possibly intersect each other. Accordingly, the next point to be incremented to may not be a next point along the path. Rather, the next point to be incremented to may be a point corresponding to the vector of movement. In one embodiment, candidate points are reflex points having inner angles that are obtuse.

This next valid point to be incremented to is a "move-to" point. The move-to point may not necessarily be the immediate neighbor of the candidate point; rather, the move-to point corresponds to the vector of movement such that the current stroke receives a natural continuation corresponding to the notion of a natural movement of a pen used to draw the stroke. Thus, moving from the candidate point to next point along the path that is not a move-to point violates the notion of a natural continuation of a stroke. Therefore, the valid move-to point for a candidate point is selected based on the vector of movement, and the valid move-to point is stored as an "occurrence" or "event," as shown in step 3010.

Conversely, if the current point of the side is not a candidate point, then vector of movement determination need not be applied. In this case, the valid move-to point may be selected independent of the vector of movement, as shown in step 3012.

A "move-to" point on a side lies proximate to a line formed by the side's previous point and the side's current point. Whether a point is proximate is determined based on the difference between a flat angle and an angle defined by the triple of vertices comprising the previous point (side_previous_point), the current point (side_current_point), and the proposed "move-to" point. The difference is preferably less than a specified flatness threshold value. For each particular font the flatness threshold value may differ, and typically ranges between 10 to 25 degrees.

In one embodiment, where there are several proposed move-to points to be evaluated, the point selected as the valid move-to point is the point closest to the current point of the side in terms of distance between them. In another embodiment, where there are several proposed move-to points to be evaluated, the point selected as the valid move-to point is the point for which the difference is most below the flatness threshold. Other evaluation criteria may also be used.

If a valid move-to point is found, the movement continues to the valid move-to point. The movement from a candidate point to a valid move-to point is stored as an "occurrence" or "event," as shown in step 3012. Events may be further classified for each side, and as mutual events. Mutual events are recorded when the events happen at both sides simultaneously. The mutual event is stored as pairs of candidate points of both sides and their corresponding move-to points. Events may connect two strokes together and may serve as potential starting points for other strokes.

Step 3014 determines if all of the points for a given stroke have been processed, or if the stroke is closed. If points remain to be processed or if the stroke is not closed, then steps 3004-3012 are repeated. Otherwise, step 3016 determines if any events or points for the glyph remain to be processed. If so, then a new set of points is selected, as shown in step 3018, and steps 3004-3016 are repeated. Otherwise, the process is complete.

Figure 10:
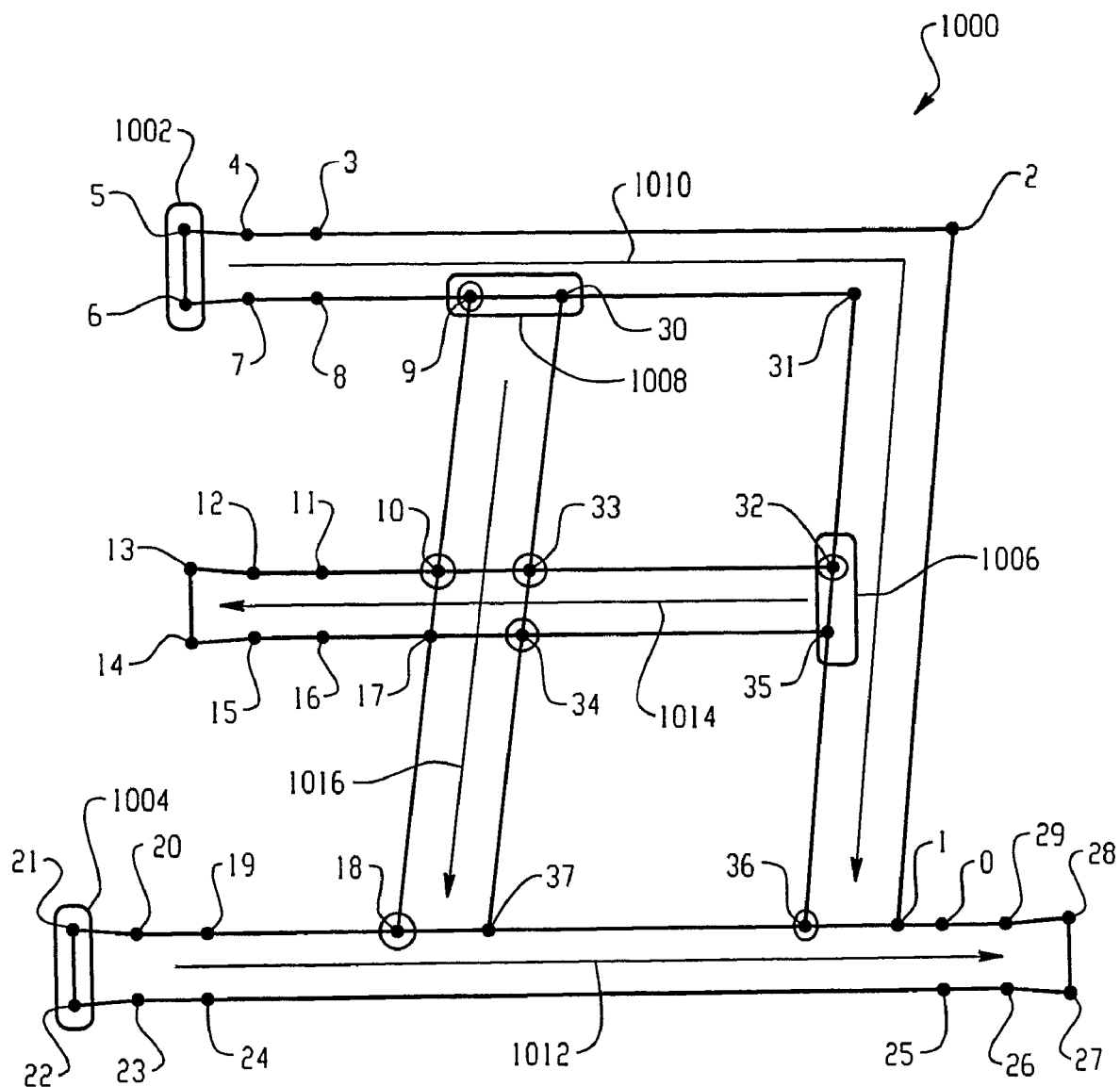
FIG. 10 illustrates a dissected glyph.

FIG. 10 shows a line diagram of an exemplary glyph 1000 dissected in accordance with the glyph dissection process 3000. The exemplary glyph 1000 has an outline shape defined by points 1 to 37. Pairs of start points enclosed in rectangles 1002, 1004, 1006, 1008 are start points of strokes 1010, 1012, 1014, 1016. The points 9, 30 and 32, 35 denoted by the rectangles 1006, 1008 are also events that are start points of strokes 1014 and 1016. Encircled points 9, 33, 18, 32, and 36 are candidate points and their corresponding move-to points are 30, 10, 37, 35, and 1, respectively, according to the direction of each stroke as indicated by the central arrows of strokes 1010, 1012, 1014 and 1016. Candidate point 33 is common to strokes 1014 and 1016 and thus is associated with move-to point 10 for stroke 1014 and move-to point 34 for stroke 1016. Each of the strokes 1010, 1012, 1014, 1016 is denoted with an arrow that indicates the vector of moment.

Figure 5F:
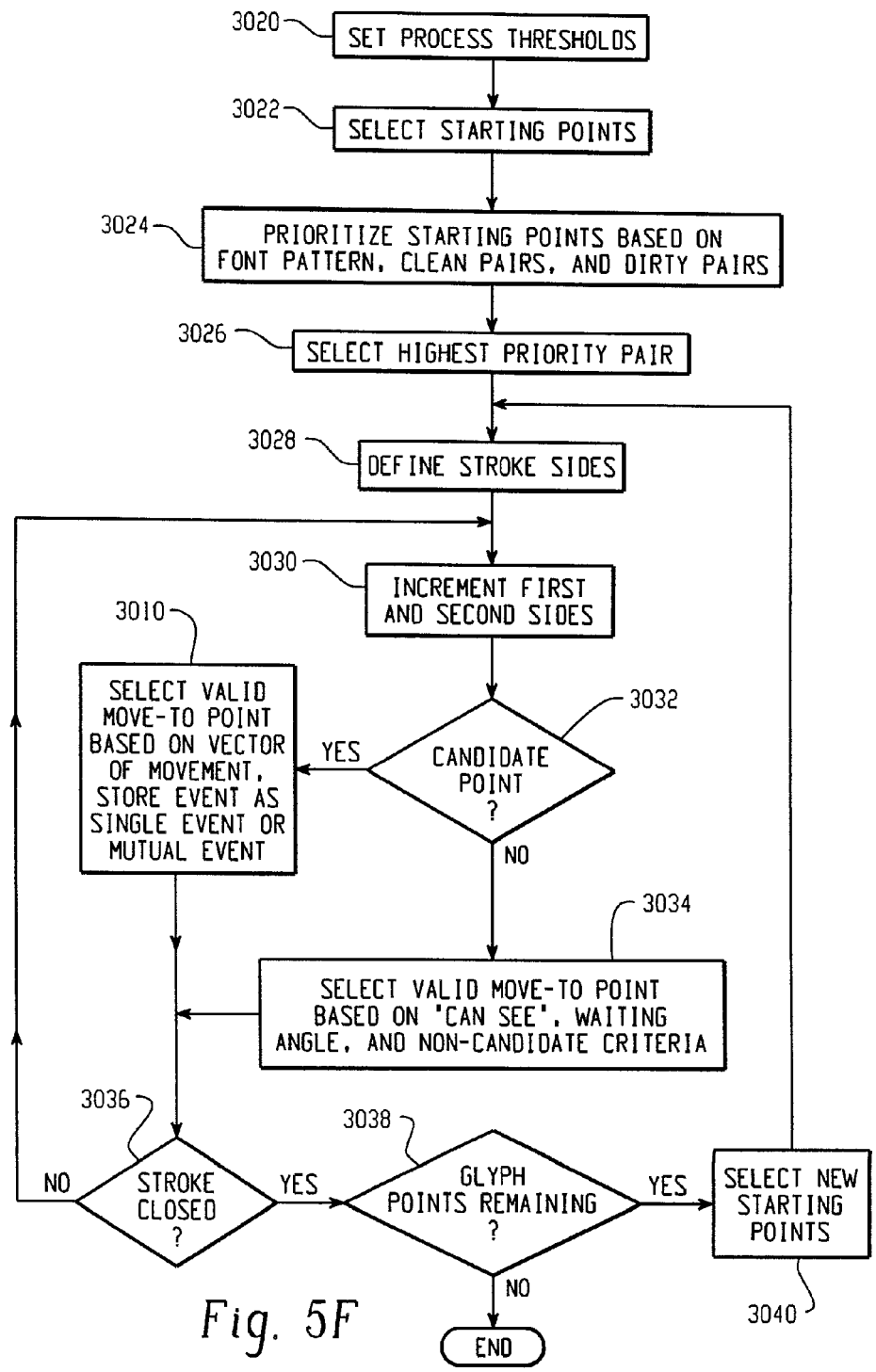
FIG. 5F is a more detailed flowchart of the glyph dissection process.

FIG. 5F provides a more detailed flowchart of the glyph dissection process 3000. Step 3020 sets various processing values. In one embodiment, the various processing values include, a flatness threshold value, a starting threshold value, a starting span depth value, an unmarked points tolerance value, and an unmarked segments tolerance value.

The flatness threshold value is used to evaluate a potential move-to point. The starting threshold value starting span depth value is used to determine starting points. The unmarked points tolerance value is used to specify how many unprocessed points may be tolerated for a given shape. The unmarked segments tolerance value is used to specify how many unprocessed segments may be tolerated for one shape.

A pair of starting points is then selected, as shown in step 3022. In one embodiment, the start points are selected according to their position on the x-y axis, e.g., the left most pairs of points, such as points 5, 6, 21 and 22 of FIG. 10, are selected as start points. Other methods of selecting start points may also be used.

The starting threshold value is used to define a point as a candidate. If the angles at the vertices in question are less than the starting threshold value, the points are a valid pair of starting points and are defined as clean starting points. If both angles are greater than the starting threshold value, the pair is discarded and another pair is picked. If one of the angles is greater than the starting threshold value, then an angle that is the difference between the one of the angles and 360 degrees is compared to the starting threshold value. If the compared value is less than the starting threshold value, the pair of points is a valid pair of starting points and defined as dirty starting points.

Pairs are not immediate neighbors; there is typically at least one point between them. The depth of the distance, in amount of points, is defined by the starting span depth value.

The process of selecting starting points may be simplified by utilizing a font pattern. In one embodiment, if a font pattern is used, pairs of starting points selected according to the font pattern have priority over other pairs. Likewise, clean pairs have priority over dirty pairs. After determining all the possible pairs, the pairs are prioritized in step 3024 and selected based on the priority in step 3026. Within each priority group a pair with the smallest distance between the points is selected.

After picking a pair of starting points, the two sides of the stroke are defined, as shown in step 3028. Each side has a starting point and is incremented along a path from this starting point, as shown in step 3030. In one embodiment, the points of each shape are stored in an array data structure, and incrementing along a path results in iterating through the array from the array cells storing the starting points.

The point is then evaluated to determine whether it is a candidate point, as shown in step 3032. When a candidate point is encountered, valid move-to points are determined as described above in steps 3010 and 3012. If the point is not a candidate point, the system increments to the next point along the path, as shown in step 3034. For non-candidate points, the instant point is incremented to the next point if the instant points on both sides are valid neighbors, satisfy a waiting angle evaluation, and the next point is not owned by another already created stroke. These conditions are typically valid only for points that are not candidate points, since candidate points may be co-owned by several strokes due to stroke intersections.

A "can-see" rule is used to determine if the instant points on both sides are valid neighbors. The can-see rule is satisfied if, at each increment, both sides' instant points "see" each other, i.e., the instant point of a first side has the instant point of the second side among its valid neighbors. Violation of the can-see rule may result either from a wrongly chosen move-to point during an occurrence or from the layout of the shape of the glyph.

During the determination of a valid move-to point for the given candidate point, a violation of the can-see rule results in the proposed move-to point being discarded. If the violation is caused by the layout of the shape of the glyph, then the instant point is discarded and the point closest to the instant point from the list of valid neighbors of the other side is selected. For example, if a violation of the can-see rule results while moving along one side of the stroke, the instant point of that side is discarded and replaced by the first available point from the list of neighbors of the other sides' instant point.

The waiting angle value is used to prevent possible "can-see" rule violations by normalizing the increment rate of movement along both sides of the stroke. For example, a first side may increment quickly if there are fewer points along the first side's path and the distances between the points are relatively large as compared to the points of the second side. The second side may thus comprise more points and lag the first side for an equal number of increments. To facilitate the current points of both sides being proximate, the angles defined by the current points and relative to the two sides are compared for each side to a waiting angle. If the angle of a side is less than the waiting angle, then the current point for that side is not incremented, while the current point for the other side is incremented.

Figure 11:
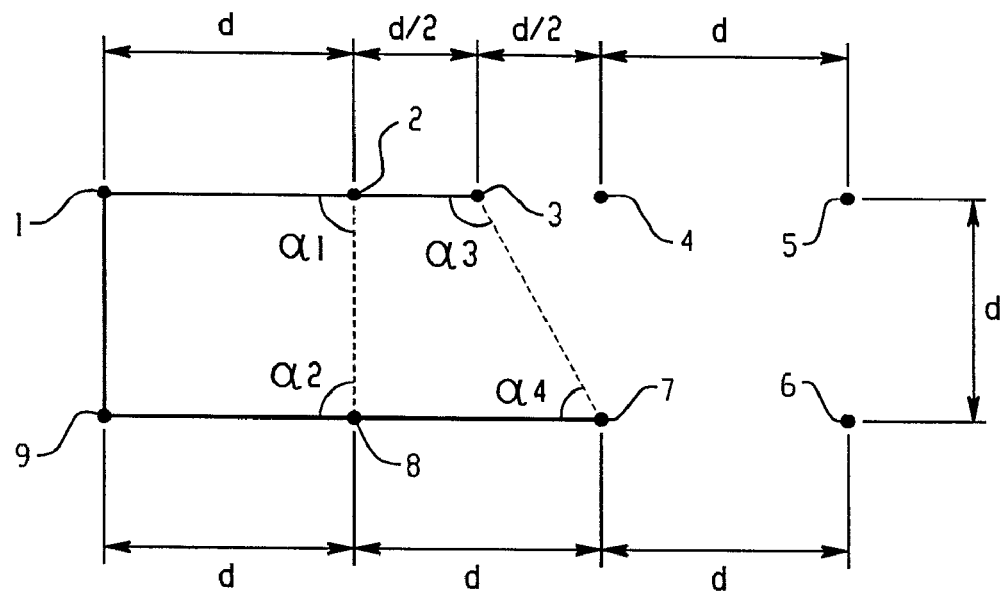
FIG. 11 illustrates a waiting angle for several points.

FIG. 11 illustrates a waiting angle for several points. A rectangle is defined by points 1-9 and having start points 1 and 9. The path is incremented from start points 1 and 9 to points 2 and 8, respectively. Waiting angles $\alpha_1$ and $\alpha_2$ are compared to a threshold waiting angle (e.g., 66 degrees). Since both weighing angles $\alpha_1$ and $\alpha_2$ exceed 66 degrees, both paths are incremented. Waiting angles $\alpha_3$ and $\alpha_4$ are compared to the threshold waiting angle. Because waiting angle $\alpha_4$, which is 45 degrees, is less than the waiting angle of 66 degrees, the path from point 7 will not be incremented to point 6, while the path from point 3 will be incremented to point 4.

Each time both sides perform a move to their corresponding next points or after an occurrence or event occurs, the system determines whether a currently processed stroke may be closed, as shown in step 3036 of FIG. 5F. The closing of a stroke defines a data structure that stores all the points defining the two sides, pairs of start and end points of each side, and events. Every processed point is classified as owned, except for candidate points, as candidate points may be common to several strokes. The number of strokes the candidate point is common to may be stored in the data structure.

Upon closing a stroke, the system determines whether any of the points of the shape of the glyph have been left unprocessed, as shown in step 3038. For example, if any point is not owned or not a candidate point, then the point has not been processed. Events are evaluated to determine whether there are remaining events to process. Events may be stored in a queue, and the first event in the queue is processed as a starting pair of points for a next stroke. If the event queue is empty, then new starting points are picked and a pair of starting points is chosen, as shown in step 3040. Point processing is complete when there are no remaining points to process or the number of unprocessed points is within a user-defined value.

FIG. 12 shows an exemplary log from processing the glyph of FIG. 10. The log lists the processing steps of dissection and the information that each stroke contains. All of the separate shapes of the exemplary glyph are iterated through to dissect each one of them into strokes.

The last step of glyph dissection 3000 is the merging of strokes, as shown in step 3042. To reduce redundancy, certain strokes may be unified into one so that the number of lines in the glyph under the compact font format is reduced. The merging process searches for completely contained strokes, and explicitly connected and implicitly connected strokes.

A completely contained stroke is a stroke that is completely contained in another stroke.

In one embodiment, the determination of whether a stroke is completely contained includes the step of determining whether all of the points of a first stroke are contained within the bounds defined by the points of a second stroke. If a stroke is completely contained, it is discarded.

An explicitly connected stroke is a stroke that is defined, in part, by mutual events. When events occur on both sides of a shape, the events define a mutual event. The mutual event defines two pairs of points, one pair for each side of the shape. Each pair subsequently defines a pair of starting points for another stroke when events are processed from the event queue. Thus, one mutual event may be a source for two strokes. These strokes may be merged together to form a single stroke.

Figure 13:
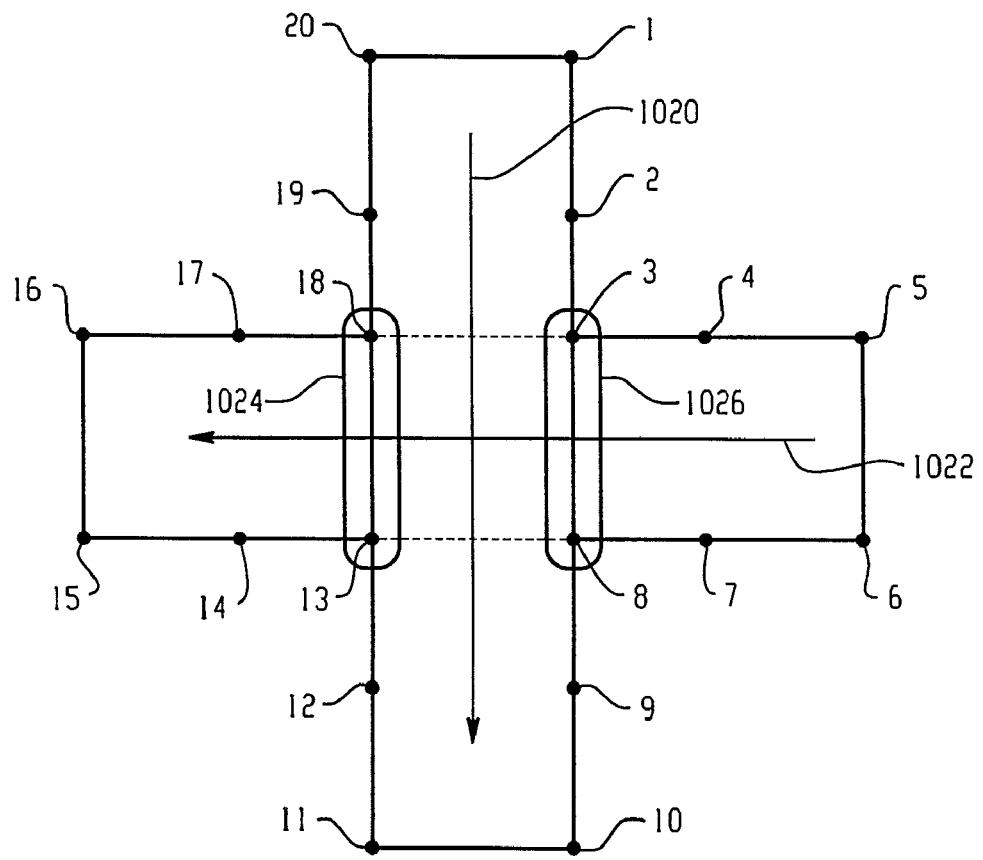
FIG. 13 illustrates an explicitly connected stroke.

FIG. 13 shows an explicitly connected stroke. A glyph defined by points 1-20 comprises strokes 1020 and 1022. Mutual events 1024 and 1026 are starting points for strokes defined by points 13-18 and 3-8, respectively. These strokes are thus combined to form an explicitly connected stroke 1022 defined by points 3-8 and 13-18.

Implicitly connected strokes occur when the pair of end points of one stroke is also the pair of starting points for another stroke. The points of the strokes are iterated through to determine whether the strokes have matching end points or starting points. If so, the strokes are merged into a single stroke.

After the merger step, the dissection process 3000 is complete, and the process of midline extraction 4000 is performed. A midline corresponds to a polygon skeleton of a given geometrical shape. A midline of a rectangle, for example, may be a straight line corresponding to the longitudinal axis of the rectangle. The skeleton is thus one or more line(s) composed of segments that provides an approximate view of the shape. The decomposition of the given glyph into strokes where each stroke provides the basis for midline in the final stroke-based shape of a glyph facilitates the derivation of a glyph skeleton. During the midline extraction process 4000, the corresponding midlines of all strokes are extracted. Extracted midlines 916 are shown, for example, in FIG. 9.

Each stroke is defined by two sides and a pair of start points and end points. The midline is determined by iterating through all of the points of the stroke. For each point on a first side a corresponding nearest point from the second side is found. For a segment defined by these two points a midpoint is found and added to a midline. The process is repeated for each point on the second side. After both sides have been processed, the length of both midlines is calculated. The longer midline is defined to be the midline of the stroke.

The final midlines may be simplified by simplification processes similar to the glyph simplification process 2100 described above, and by merging midlines in a similar manner as described with respect to the merger step of the dissection process 3000 described above. Midline simplification reduces number of points in the glyph skeleton.

In the step of element analysis 5000, the glyphs are searched for elements having repetitive patterns. According to one embodiment of the present invention, pattern matching determines whether the patterns are repetitive. Pattern matching may be performed by using a database of patterns. The patterns that occur frequently in the font are extracted from the font. The glyphs are defined in the database and the particular sections of the glyphs that have matching patterns are stored. The information is read from the database prior to the pattern matching process.

During the pattern matching process, the contours of a given glyph are compared to patterns from the database. The comparison is based on similarity measurements obtained from invariance functions that measure certain parameters of the shape. These parameters typically remain unchanged even when the shape undergoes different geometrical transformations, and are thus "invariant" to the transformations.

Invariance may be determined by the transformations of isometry, similarity, and affine. An isometry transformation is a transformation of the plane that preserves distances. A similarity is a transformation of the plane that preserves shapes, and is a transformation of the plane obtained by composing a proportional scaling transformation (also known as a homothety) with isometry. An affine transformation is a transformation that preserves lines and parallelism. Typical transformations used for pattern matching may include translation, proportional scaling, and nonproportional scaling. Other transformations may also be used.

An exemplary pattern matching process compares the similarity of two shapes during a translation in a two dimensional plane in which every point of an original shape is shifted by a shift value along the X or Y axis such that:

$$X_i(new) = X_i(org) + <offset>$$

and $$Y_i(new) = Y_i(org) + <offset>,$$

where $X_i$ and $Y_i$ are X and Y coordinates of the i-th point of the shape and the pattern. If the offset is known, then only one comparison may be required, e.g., whether $X_i(org)$ may be obtained by subtracting the value from $X_i(new)$.

If the offset is not known, additional comparisons between the shape and a pattern may be required. For example, a rightmost point of the shape and the pattern may be determined respective X and Y coordinates subtracted to obtain an offset value. The remaining points of the shape are selected and the X and Y coordinates of the points are subtracted from the offset value. If, as a result of subtraction, the X and Y coordinates of the corresponding point of the pattern is received, then the shape is similar to the pattern. If the subtraction gives such result for all the points of the shape, then the shape is similar to the pattern. On the contrary, if the subtraction results in different X and Y coordinate in the shape from the X and Y coordinates of the point of the pattern, then the shape is not similar to the pattern. Thus, under the translation transformation the distances for similar shapes and patterns remain unchanged.

For each glyph, the identified patterns are identified as common elements 202 or unique elements 212 as described with reference to FIG. 2 above. If a matching pattern is not found, then a unique element is used to describe the particular stroke.

Data such as font data provided by the Unicode consortium may be used to define font elements. For CJK glyphs, for example, which define ideographs, radical-based element extraction may be used. Radicals are strokes or event complete ideographs used to simplify the searching process in CJK dictionaries. Similarly, under Unicode specifications, all the ideographs are grouped by the radicals (see, e.g., Kangxi Radicals or CJK Radicals Supplement of the Unicode specifications). These radicals are the primary elements that are extracted. Pattern data used during the pattern matching process comprises the glyphs, or parts of the glyphs that are radicals. In addition to the radicals of the CJK, additional patterns are defined based on the visual estimation, if any specific glyph or part of the glyph is recurrent in many glyphs.

By way of another example, for Korean Hangul syllables there are defined decomposition rules that allow decomposing of each Hangul syllable to its Jamo characters, which is also covered by a Unicode specification. In Korean language all the Hangul syllables are composed of Jamo characters, and thus Jamo glyphs may be regarded as basic elements to compose Hangul glyphs for Korean.

For other languages, Unicode normalization charts, for example, may be used. For each composite glyph these charts define the simple glyphs which the composite glyph comprises. There are normalization charts for Hangul, Japanese, some CJK ideographs, complex Latin glyphs, and complex Arabic glyphs. This information is used in the element analysis 5000 to define the elements of the compact font format.

In another embodiment, pattern matching is accomplished without specific glyph data. Each shape is iterated through and stored in an evaluation database. The system recursively determines whether there exist common elements based on the data stored in the common database.

In the conversion step 6000, the geometrical data of the outline font is adjusted to the specifications of compact font format. For example, the original points specified in TrueType™ typeface design units are converted to compact font format design units. This conversion may be subject to various font metrics, such as font baseline, font ascent and font descent. Other metrics may also be used.

The conversion step 6000 stores the font data as a set of data structures 200 and a database 250 as described with reference to FIG. 2 above. Elements that are pattern matched with other elements are stored as common elements 204 in the element database 250, and are referenced in a corresponding glyph data structure 200. The glyph data structure 200 also stores corresponding shift X values 206, shift Y values 208, and scaling values 210. Unique elements 212 are stored with the attendant description data 216 as described with reference to FIG. 2 above. Another exemplary data structure is that of the Slangsoft Font Format as described in the above-referenced provisional application 60/393,795. Other data structures and storage architecture may also be used.

After the conversion step 6000 is completed, the font data may then be stored on a mobile device 100 for use with an application program or rendering engine as described with reference to FIG. 1 above. The conversion step 6000 may also be incorporated in the element analysis step 5000.

While the systems and methods of this present application have been described with reference to font data, the systems and methods of this present application may also be applied to other data types, such as graphical data entities, map entities, or other visual display entities. In another embodiment, the exemplary data structures of the present system and method may be used to store map data in a compact format. For example, the map of a geographic region, such as a city, may be stored in the compact format of the exemplary data structure and accessed by a rendering engine to reconstruct a map of the city. Additionally, as the mobile device changes location, additional mapping data for the new geographic region in which the mobile device is located may be downloaded.

This written description uses illustrative embodiments to disclose the invention, including the best mode, and also to enable a person of ordinary skill in the art to make and use the invention. Other embodiments and devices are within the scope of the claims if they have elements that do not differ from the literal language of the claims or have elements equivalent to those recited in the claims.

What is claimed is:

1. A method for rendering text from stored font data, comprising:
   receiving at a rendering engine a request to render a glyph;
   in response to the request, the rendering engine accessing a font data structure stored in a computer readable medium, the font data structure including common element data and unique element data for a plurality of glyphs;
   the rendering engine constructing a glyph skeleton using the common element data and unique element data; and
   the rendering engine rendering the glyph for display using the glyph skeleton.

2. The method of claim 1, further comprising:
   applying a typeface characteristic to the glyph skeleton to render the glyph.

3. The method of claim 2, wherein the typeface characteristic includes a font style.

4. The method of claim 2, wherein the typeface characteristic includes a line thickness.

5. The method of claim 1, further comprising:
   generating the font data structure from source font data; and
   loading the font data structure into the computer readable medium on a mobile device.

6. A mobile communication device, comprising:
   a computer readable medium;
   a font data structure stored in the computer readable medium, the font data structure including common element data and unique element data for a plurality of glyphs;
   an application program configured to request glyphs for display on the mobile communication device; and
   a rendering engine configured to:
      receive a request from the application program to render a glyph;
      in response to the request, access the font data structure to identify common element data and unique element data for the glyph;
      construct a glyph skeleton using the identified comment element data and unique element data; and
      render the glyph for display using the glyph skeleton.

7. The mobile communication device of claim 6, wherein the rendering engine is further configured to apply a typeface characteristic to the glyph skeleton to render the glyph.

8. The mobile communication device of claim 7, wherein the typeface characteristic includes a font style.

9. The mobile communication device of claim 7, wherein the typeface characteristic includes a line thickness.

10. The mobile communication device of claim 6, wherein the font data structure is generated from source font data and loaded into the computer readable medium from an external computer.

* * * * *